United States Patent
McCullagh

(10) Patent No.: US 10,412,159 B1
(45) Date of Patent: Sep. 10, 2019

(54) DIRECT LOAD BALANCING USING A MULTIPATH PROTOCOL

(71) Applicant: Amazon Technologies, Inc., Revo, NV (US)

(72) Inventor: Gavin Derek McCullagh, Cork (IE)

(73) Assignee: Amazon Technologies, Inc., Reno, NV (US)

( * ) Notice: Subject to any disclaimer, the term of this patent is extended or adjusted under 35 U.S.C. 154(b) by 354 days.

(21) Appl. No.: 14/175,895

(22) Filed: Feb. 7, 2014

(51) Int. Cl.
G06F 15/16 (2006.01)
H04L 29/08 (2006.01)

(52) U.S. Cl.
CPC .................... *H04L 67/1038* (2013.01)

(58) Field of Classification Search
CPC ..... H04L 67/1029; H04L 45/00; H04L 45/24; H04L 67/1038; G06F 9/5083
See application file for complete search history.

(56) References Cited

U.S. PATENT DOCUMENTS

| | | | | |
|---|---|---|---|---|
| 8,004,971 B1 * | 8/2011 | Szabo | ................. | H04L 12/4625 370/230 |
| 2003/0056002 A1 * | 3/2003 | Trethewey | .......... | H04L 67/1002 709/238 |
| 2004/0260745 A1 * | 12/2004 | Gage | ................. | H04L 29/12009 709/200 |
| 2007/0094361 A1 | 4/2007 | Hoynowski et al. | | |
| 2008/0034110 A1 * | 2/2008 | Suganthi | ............. | H04L 63/0272 709/238 |
| 2009/0252134 A1 * | 10/2009 | Schlicht | ................ | H04L 1/0015 370/338 |
| 2010/0302940 A1 | 12/2010 | Patel et al. | | |
| 2011/0296006 A1 * | 12/2011 | Krishnaswamy | ........................... | H04L 29/12952 709/224 |
| 2012/0166639 A1 | 6/2012 | Hoynowski et al. | | |
| 2012/0311159 A1 | 12/2012 | Bansal et al. | | |

(Continued)

OTHER PUBLICATIONS

MultiPath TCP—Linux Kernel implementation, "The Fastest TCP Connection with Multipath TCP", C. Paasch et al., Mar. 24, 2013, pp. 1-3.

(Continued)

*Primary Examiner* — Umar Cheema
*Assistant Examiner* — Ahn Nguyen
(74) *Attorney, Agent, or Firm* — Robert C. Kowert; Meyertons, Hood, Kivlin, Kowert & Goetzel, P.C.

(57) ABSTRACT

Multipath load balancing methods and apparatus that may be implemented on or by load balancers in load balanced systems. The multipath load balancing method may leverage a multipath network protocol to establish multiple paths for at least some connections between client hosts and server hosts in load balanced systems, each connection corresponding to a particular data flow between a respective client host and server host. Using the multipath load balancing method, a load balancer may operate to establish a bi-directional connection directly between a client host and a server host after first establishing a connection between the client host and server host that passes through the load balancer. Most or all of the traffic that would move between the client host and the server host via the load balancer can then be diverted onto the second, more direct connection between the client host and the server host.

23 Claims, 7 Drawing Sheets

(56) References Cited

U.S. PATENT DOCUMENTS

| | | | | |
|---|---|---|---|---|
| 2013/0254375 A1* | 9/2013 | Agiwal | ............... | H04L 43/0882 709/224 |
| 2014/0112139 A1* | 4/2014 | Allan | .................... | H04L 47/125 370/235 |
| 2015/0067027 A1* | 3/2015 | Liu | .................... | H04L 67/1027 709/203 |

OTHER PUBLICATIONS

"Maximize Mobile User Experience with NetScaler Multipath TCP", John Gudmundson, et al., May 28, 2013, pp. 1-4.
MultiPath TCP—Linux Kernel implementation, "Welcome to the Linux Kernel MultiPath TCP project", Jan. 22, 2014, pp. 1-3.
ICTEAM, "MultiPath TCP: From Theory to Practice", Sebastien Barre, et al., 2011, pp. 444-457.
Internet Engineering Task Force, "Architectural Guidelines for Multipatch TCP Development" A. Ford, et al., Mar. 2011, pp. 1-29.
Internet Engineering Task Force, "TCP Extensions for Multipath Operation with Multiple Addresses", A. Ford, et al., Jan. 2013, pp. 1-64.
U.S. Appl. No. 13/167,555, filed Jun. 23, 2011, James Sorenson, III et al.
U.S. Appl. No. 13/167,557, filed Jun. 23, 2011, James Sorenson, III et al.
U.S. Appl. No. 13/864,162, filed Apr. 16, 2013, James Christopher Sorenson, III et al.
U.S. Appl. No. 13/864,157, filed Apr. 16, 2013, James Christopher Sorenson, III et al.
U.S. Appl. No. 13/864,167, filed Apr. 16, 2013, James Christopher Sorenson, III et al.

* cited by examiner

DIRECT LOAD BALANCING USING A MULTIPATH PROTOCOL

BACKGROUND

As the scale and scope of network-based applications and network-based services such as cloud computing services have increased, data centers may house hundreds or even thousands of host devices (e.g., web servers) that need to be load balanced. Conventional load balancers may generally include one or more network interface controllers (NICs), for example eight NICs, that handle inbound traffic from/outbound traffic to clients and inbound traffic to/outbound traffic from the host devices (e.g., servers such as web servers) that are being load balanced. Load balancers typically also include logic that implements load balancing techniques such as round robin and/or least connections (least conns) techniques to select which host device will handle a connection from a client.

In conventional load balancers, clients communicate with selected host devices on connection(s) that pass through the load balancer, and thus the data exchanged between a client and a selected host device in a conventional load balanced system flows through the load balancer. Some conventional load balancers may serve as proxies to the host devices that they front, and thus may terminate connections (e.g., Transmission Control Protocol (TCP) connections) from the clients and send the client traffic to the host devices on connections (e.g., TCP connections) established between the host devices and the load balancer. In other conventional load balancers, the load balancer does not terminate connections from the client and the host device. Instead, connections (e.g., Transmission Control Protocol (TCP) connections) are established between clients and host devices that pass through the load balancer. The load balancer modifies header information (e.g., TCP and IP header information) in packets that pass through the load balancer on the connections to transparently route traffic between the clients and host devices. These load balancers may be viewed as serving as routing/network address translation (NAT) firewalls between the clients and the load balanced host devices.

Multipath TCP

Multipath TCP (MPTCP) is a network protocol proposed by the Internet Engineering Task Force (IETF) in the document Request for Comments (RFC) 6824. In traditional Transmission Control Protocol/Internet Protocol (TCP/IP), communication is restricted to a single path per connection, even though multiple possible paths may exist between peers. RFC 6828 presents MPTCP as a set of extensions to traditional TCP to support multipath operation and thus allow multiple TCP flows across two or more potentially disjoint paths for a connection between two peers. Note that both peers would need to support the MPTCP protocol in order to establish multiple paths for a connection according to MPTCP.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for load balancing using a multiple path (multipath) protocol are described. Embodiments of a multipath load balancing method are described that may be implemented on or by load balancers in load balanced systems. The multipath load balancing method may leverage a multipath network protocol, for simplicity referred to herein as a multipath protocol, to establish multiple (two or more) paths for at least some connections between client hosts and server hosts in load balanced systems, each connection corresponding to a particular data flow between a respective client host and server host. While any suitable multipath protocol may be used, an example multipath protocol that may be used in at least some embodiments is Multipath Transmission Control Protocol (Multipath TCP, or MPTCP). Using an embodiment of the multipath load balancing method, a load balancer may operate to establish a bi-directional connection (e.g., an MPTCP subflow) directly between a client host and a server host after first establishing a connection (e.g., via MPTCP) between the client host and server host that passes through the load balancer. Most or all of the traffic that would conventionally move between the client host and the server host via the load balancer can then be diverted onto the second, more direct connection (e.g., an MPTCP subflow) between the client host and the server host.

Figure 1A:
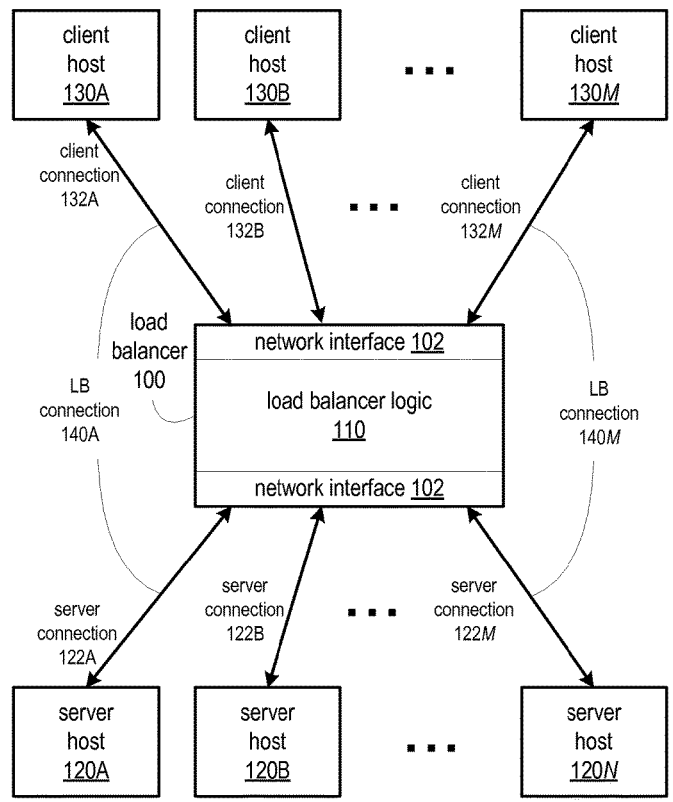
FIG. 1A illustrates a load balanced system in which embodiments of a multipath load balancing method may be implemented.

FIG. 1A illustrates an example load balanced system in which embodiments of a multipath load balancing method may be implemented. In a load balanced system, a load balancer 100 may front multiple server hosts 120A, 120B ... 120N. As a non-limiting example, a load balancer 100 may be a device that includes a network interface 102, for example implemented as or by one or more network interface controllers (NICs), that handles inbound traffic from/outbound traffic to client hosts 130 and inbound traffic to/outbound traffic from the server hosts 120 that are being load balanced. Load balancer 100 may also include logic 110 (one or more processors, memory, software, data, drivers, etc.) that implements load balancing functionality including but not limited to a load balancing technique (e.g., least conns) used to select a particular server host 120 from among the multiple server hosts 120 fronted by the load balancer 100 to receive a given data flow from a client 130.

Figure 6:
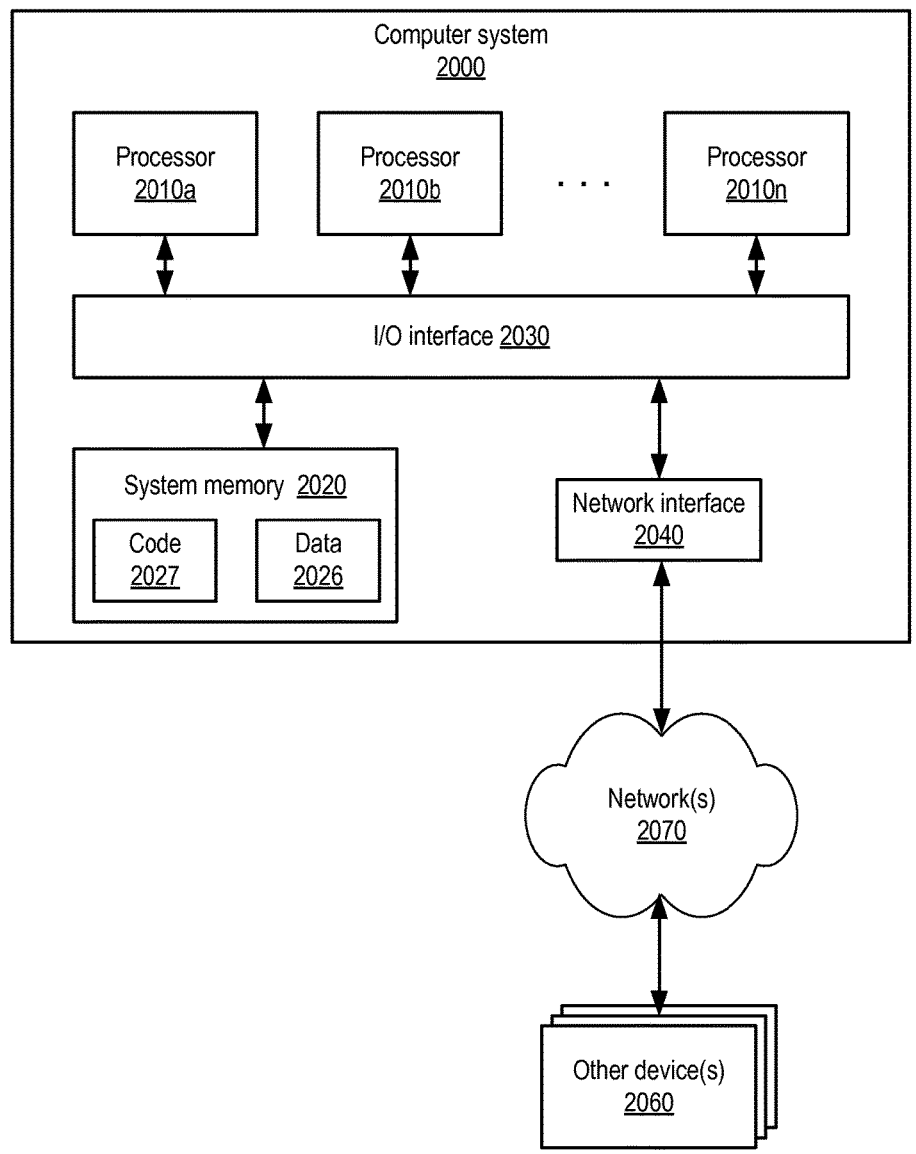
FIG. 6 is a block diagram illustrating an example computer system that may be used in some embodiments.

Load balancer 100 may front tens, hundreds, or thousands of server host 120. Each server host 120 may publish one or more IP addresses to the load balancer 100. Further, each server host 120 may include one or more instances of a server or service that is being load balanced. Examples include, but are not limited to, application servers, web servers, or in general any type of server, as well as services such as storage services. As a non-limiting example, server hosts 120 may be implemented as slot-mounted computing devices, for example blade servers, mounted in racks in a data center that implements a service provider's network, and the servers on the server hosts 120 may collectively represent a service (or services) provided by the service provider to one or more clients of the service provider. FIG. 6 illustrates an example computing device that may be used as a server host 120 in at least some implementations of a load balanced system.

Load balancer 100 may receive connection requests from multiple client hosts 130A, 130B . . . 130M for access to the service(s) provided by the server hosts 120 fronted by the load balancer 100. Note that a load balancer 100 may serve any number (tens, hundreds, thousands, or more) of client hosts 130. Each client host 130 may be a computing device that may include one or more instances of one or more applications that may access the service provided by the service provider and implemented on or by the load balanced system, and that thus may generate connection requests that are received by the load balancer 100. FIG. 6 illustrates an example computing device that may be used as a client host 130. As a non-limiting example of an application that may access the service provided by the service provider and implemented on or by the load balanced system, a client host 130 may include a web browser via which a client may access the service. As another example, an application on a client host 130 may be a program or module that accesses a storage service implemented on the load balanced system, with each server host 120 being a storage host that includes or fronts one or more storage devices.

As another example of a load balancer system in which embodiments may be implemented, the server hosts 120 may collectively implement a service on a network, and client hosts 130 may be components, nodes, or instances of another service on the network. For example, server hosts 120 may implement a storage service on a service provider's network, and client hosts 130 may be components of another service that uses the storage service for data storage and retrieval. As another example, server hosts 120 may implement a storage service on a service provider's network that provides virtualized storage to a plurality of clients, and client hosts 130 may be instances of virtual computation resources (e.g., virtual machines (VMS)) on the service provider network that are provided to the clients through a hardware virtualization service and that may access the virtualized storage service implemented on the storage hosts 120 for data storage and retrieval.

In a load balancer 100 as illustrated in FIG. 1A that acts as a proxy between client hosts 130 and server hosts 120, a client host 130 may connect to the load balancer 100 (e.g., to a Virtual IP (VIP) address hosted by the load balancer) according to a network protocol (e.g., Transmission Control Protocol (TCP)). The connection between the client host 130 and the load balancer 100 may be referred to as a client connection 132. For example, client host 130A may communicate with load balancer 100 according to TCP to establish a client connection 132A. The load balancer 100 then uses a load balancing technique (e.g., least connections, or least conns) to select a particular server host 120 from among the multiple server hosts 120 fronted by the load balancer 100, and establishes a connection to the selected server host 120, for example a TCP connection to an IP address of the selected server host 120. The connection between the load balancer 100 and the server host 120 may be referred to as a server connection 122. For example, load balancer 100 may establish a server connection 122A to server host 120A. Packets (e.g., TCP segments) may then be exchanged between the client host 130A and server host 120A via the load balancer 100. The load balancer 100 may essentially act as a proxy between the client host 130A and the server host 120A. The load balancer 100 terminates the connection from the client host 130A (the client connection 132A) and sends the client traffic to the respective server host 120A via the server connection 122A. Similarly, return traffic from the server host 120A to the client host 130A is sent via the server connection 122A, which is terminated by the load balancer 100, which sends the return traffic to the respective client host 130A via the client connection 132A.

FIG. 1A shows each client host 130A, 130B . . . 130M with one client connection 132A, 132B . . . 132M to load balancer 100, and also shows a corresponding server connection 122A, 122B . . . 122M from load balancer 100 to one of the server hosts 120A, 120B . . . 120N. However, in at least some implementations, each client host 130 may establish one, two, or more client connections 132 to a load balancer 100, and that load balancer 100 may establish one, two, or more server connections 122 to each server host 120. Note that there may generally not be a one-to-one correspondence between client hosts 130 and server hosts 120; in other words, while M may be equal to N, typically, M≠N. Also note that while load balanced systems as illustrated in FIG. 1A may have many server hosts 120 and many client hosts 130, load balanced systems may be implemented where M is at least one and N is at least two. In other words, a load balanced system may have two or more server hosts 120 and one or more client hosts 130.

FIG. 1A shows a single load balancer 100 device. Note, however, that in some implementations a load balanced system that fronts multiple server hosts 120 may include two or more load balancer 100 devices. For example, each of two or more load balancers 100 in such a system may be configured to load balance traffic from client hosts 130 to a specified subset of the server hosts 120, or to load balance traffic for a specified address range. Further note that a load balanced system may include one or more other components than those shown in FIG. 1A. For example, a load balanced system may include one or more routers or other network devices located between load balancer 100 and client hosts 130, and/or a network fabric (e.g., an L3 network) between load balancer 100 and server hosts 120. Note that the other components may be selected to support the bandwidth/throughput of the load balancer 100. For example, one or more router(s) between client hosts 130 and a load balancer 100 that provides 40 Gbps throughput should also support at least 40 Gbps throughput.

FIG. 1A illustrates an example load balancer 100 that acts as a proxy between client hosts 130 and server hosts 120. For a given connection between a client host 130 and a selected one of the server hosts 120, the load balancer 100 establishes a client connection 132 to the client host 130 and a server connection 122 to the server host 122. For example, the load balancer 100 has established client connection 132A to client host 120A and server connection 122A to server host 120A for a connection between client host 130A and server host 120A. The load balancer 100 terminates the client connection 132A and the server connection 122A. The load balancer 100 receives traffic from the client host 130A via the client connection 132A and sends the traffic to the selected server host 120A via the respective server connection 122A.

FIG. 1A illustrates an example load balancer 100 that acts as a proxy between client hosts 130 and server hosts 120. However, other load balancers do not act as proxy load balancers and do not terminate connections to the client hosts 130 and connections to server hosts 120 as illustrated in FIG. 1A. For example, in some load balancers, in response to a client host 120's connection request, a connection (e.g., a Transmission Control Protocol (TCP) connection) is established between a client host 130 and a selected server host 120, the connection passing through the load balancer 100. These load balancers may be referred to as pass-through load balancers, as opposed to proxy load balancers as illustrated in FIG. 1A. Instead of receiving packets on one connection and retransmitting the packets on another connection as in the example proxy load balancer 100 shown in FIG. 1A, a pass-through load balancer 100 modifies header information (e.g., TCP and IP header information) in packets that pass through the load balancer 100 on each client/server connection to transparently route traffic between the client hosts 130 and server hosts 120. These pass-through load balancers 100 may be viewed as serving as routing/network address translation (NAT) firewalls between the client hosts 130 and server hosts 120. In addition to application in load balancers that act as proxies as illustrated in FIG. 1A, embodiments of the multipath load balancing methods may also be applied in these other types of load balancers.

For either type of load balancer 100, a connection between a client host 130 and a selected one of the server hosts 120 that goes through the load balancer 100 may be generally referred to herein as a load balancer connection, or LB connection. For example, in FIG. 1A, the connection between client host 130A and server host 120A is shown as LB connection 140A.

Figure 1B:
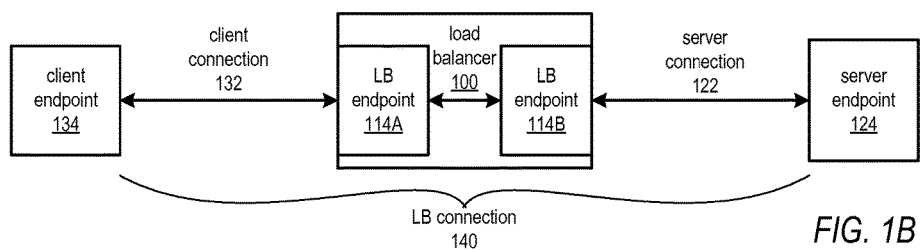
FIGS. 1B and 1C illustrate connections or paths that pass through a load balancer in a load balanced system.
Figure 1C:
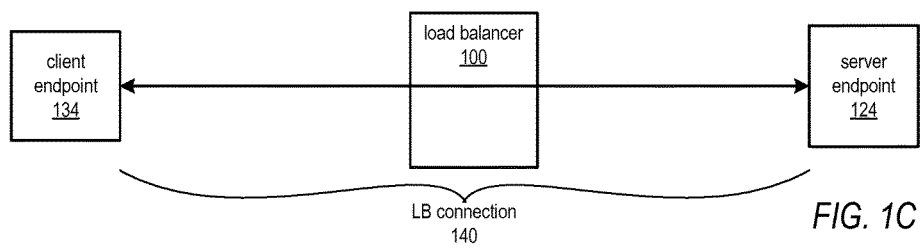

FIGS. 1B and 1C illustrate connections between clients and servers that go through a load balancer in a load balanced system, according to at least some embodiments. FIG. 1B shows an LB connection 140 in a load balancer 100 that acts as a proxy, as illustrated in FIG. 1A. FIG. 1C shows an LB connection 140 in a pass-through load balancer as described above. As shown in FIG. 1B, a client connection 132 is established between an endpoint 134 of a client and an endpoint 114A of the load balancer 100. A server connection 122 is established between an endpoint 114B of the load balancer 100 and an endpoint 124 of a selected server. Thus, the load balancer 100 terminates the connections 132 and 122. A connection between the client and the server that goes through the load balancer 100 via connections 132 and 122 as illustrated in FIG. 1B may be referred to as a load balancer connection, or LB connection 140. As shown in FIG. 1C, a connection is established between an endpoint 134 of a client and an endpoint 124 of a selected server that goes through the load balancer 100. However, the connection is not terminated at the load balancer; instead, the load balancer 100 modifies the headers of packets that pass through the load balancer 100 on the connection so that the packets are delivered to the appropriate client or server endpoint. A connection between the client and the server that goes through the load balancer 100 as illustrated in FIG. 1C may also be referred to as a load balancer connection, or LB connection 140.

Note that the endpoints shown in FIGS. 1B and 1C may generally be defined by an IP address and a port number, and may also be referred to as sockets.

A conventional load balancer 100, for example a load balancer 100 as illustrated in FIG. 1A, may form a bottleneck for data traffic between the client hosts 130 and the server hosts 120. All traffic between client hosts 130 and server hosts 120 passes through the load balancer 100 on LB connections 140. Since there may be hundreds of client hosts 130 and hundreds of server hosts 120 in a load balanced system, it is possible for traffic flow to push or exceed the bandwidth of the load balancer 100 in one or both directions. Note that even with fewer client hosts 130 and server hosts 120, some applications may generate high volumes of traffic in one or both directions that may push or exceed the bandwidth capacity of the load balancer 100.

Another potential issue with a conventional load balancer 100, for example as illustrated in FIG. 1A, is that in some cases a client host 130 and a server host 120 to which the client host 130 is linked via the load balancer 100 may be at one location or on one network or network partition, while the load balancer 100 itself may be at another location, network, or network partition. Traffic between a client host 130 and a server host 120 is routed from the client host 130 to the load balancer 100, and then from the load balancer 100 to the client host 130. Response traffic from the server host 120 is similarly routed through the load balancer. Thus, in a load balanced system as illustrated in FIG. 1A, traffic between a client host 130 and a server host 120 generally does not travel over a direct or shortest path between the two hosts, and may even be routed from one location to another and back again. For example, a client host 130 and a server host 120 may be located in one data center, while the load balancer 100 via which the two hosts communicate may be in another data center. In this example, traffic between a client host 130 and a server host 120 would be routed from one data center to a data center at which the load balancer 100 is located, and then back to the first data center. Bandwidth on the interconnecting network infrastructures between the client host 130 and the load balancer 100 and between the load balancer 100 and the server host 120 is consumed, and transmission time between a client host 130 and a server host 120 is greater than it would be on a more direct path between the two hosts. In addition, total response time for requests may be greater than it would be on a more direct path between the two hosts.

A conventional response to the bottleneck issue in load balanced systems is to add additional load balancers 100. However, load balancers 100 that support high throughput (e.g., 40 Gbps or 80 Gbps throughput) may generally be expensive, as are the routers or other network devices that may be needed to support the load balancers 100. In addition, adding additional load balancers 100 may not resolve issues that may result from data flows between client hosts 130 and server hosts 120 at two locations being routed through a load balancer 100 at a third location.

Another response to the bottleneck issue in load balanced systems is a technology referred to as direct server return (DSR). DSR enables at least some server hosts fronted by a load balancer to establish a separate, direct connection from the server host to a client host and to thus return at least some response data directly to a client host without routing the response data through the load balancer. However, traffic on the data flow from the client host to the server host (e.g., service requests) still passes through the load balancer.

Figure 2:
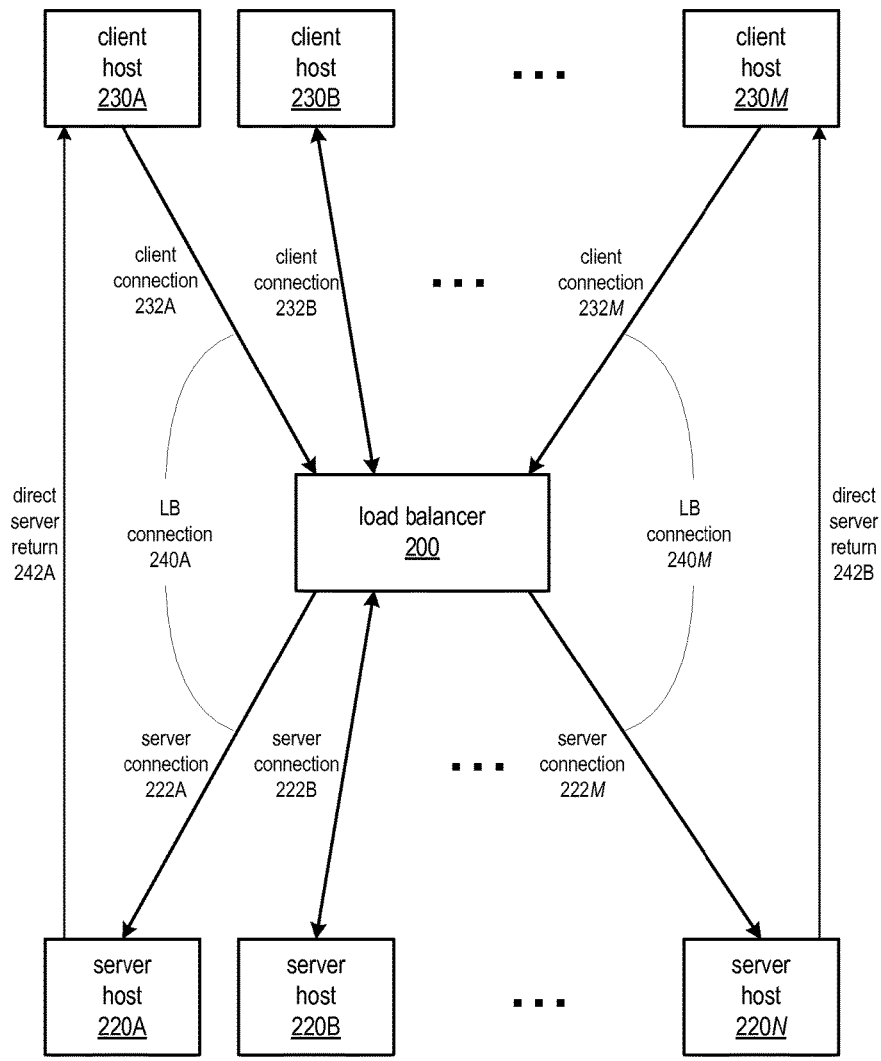
FIG. 2 illustrates a load balanced system in which direct server return (DSR) is implemented.

FIG. 2 illustrates a load balanced system in which direct server return (DSR) is implemented. Load balancer (LB) connections 240 between client hosts 230 and server hosts 220 that go through the load balancer 200 may be established as previously described. In at least some embodiments, to establish an LB connection 240, a client host 230 establishes a connection (a client connection 232) to load balancer 200. For example, client host 230A may communicate with load balancer 200 according to TCP to establish a client connection 232A. Load balancer 200 then uses a load balancing technique (e.g., least connections, or least conns) to select a particular server host 220 from among multiple server hosts 220 fronted by the load balancer 200, and establishes a connection (server connection 222) to the selected server host 220, for example a TCP connection to an IP address of the selected server host 220. In this example, load balancer 200 has established a server connection 222A to selected server host 220A. Packets (e.g., TCP segments) may then be sent from the client host 230A to host 220A over client connection 232A, through the load balancer 200, and to server host 220A via server connection 222A.

Using DSR technology, a separate path may be established for an LB connection 240A from the server host 220A to the client host 230A, shown as direct server return 242A. The server host 220A may then return response traffic to client host 230A via the direct server return 242 path. However, traffic from client 230A to server host 220A is still routed through the load balancer 200 via the LB connection 240A.

DSR may remove some of the bandwidth from a load balancer in a load balanced system by allowing return traffic from the servers to be directly sent to respective clients. DSR may be effective in relieving the bottleneck issue on load balancers in load balanced systems in which a majority of the traffic on an established data flow between a client and a server is return traffic from the server to the client. For example, DSR may be effective in reducing bandwidth usage on a load balancer in systems or with services in which clients send requests for data to servers via the load balancer, and the servers return relatively large amounts of data to the clients in response to the requests. The load balancer uses a load balancing technique (e.g., least conns) to spread load (data flows) among the servers, the requests from the clients are routed to the selected servers through the load balancer via the client and server connections, and at least some of the response data may be sent to the clients via the DSR paths.

However, DSR may not be as effective in load balanced systems in which clients may send relatively large amounts of data to the servers. For example, DSR may not be as effective in a load balanced system in which the servers implement a storage service, and clients of the service upload large amounts of data to the storage service via the load balancer. In addition, in a load balanced system that uses DSR, all of the data from a client to a server is routed through the load balancer even if the client and server are local to each other while the load balancer is remotely located, and thus issues that may result from the need to route data through the load balancer as previously described may still be present.

Multipath Load Balancing

Embodiments of a multipath load balancing method are described that may be implemented on or by load balancers in load balanced systems. The multipath load balancing method may leverage a multipath protocol to establish multiple paths for at least some connections between client hosts and server hosts in load balanced systems. While any suitable multipath protocol may be used, an example multipath protocol that may be used in at least some embodiments is Multipath Transmission Control Protocol (Multipath TCP, or MPTCP).

In the multipath load balancing method, after establishing a connection from a client host to a server host that passes through the load balancer via client and server connections, a second flow, referred to as a subflow, for the connection between the client and the server may be established on a direct connection between the server host and the client host according to the multipath protocol (e.g., MPTCP). Note that a direct connection as used herein refers to a connection between a client and a server in a load balanced system that does not pass through the load balancer. Data flow on the direct connection between the client and the server may be bi-directional. That is, in addition to or instead of the server sending data to the client via the direct connection, the client may send data to the server via the direct connection.

In at least some embodiments, the initial connection through the load balancer may be persisted after establishing the direct connection so that the connection between the client and the server can be monitored and so that load balancing of the servers (e.g., via a least conns technique) fronted by the load balancer can be properly performed. However, the load balancer may throttle down the amount of data flowing through the load balancer by shrinking or reducing the window size(s) on the initial connection through the load balancer, thus causing more data, a majority of the data, or even all of the data flowing between the respective client and server to pass over the direct connection rather than through the load balancer. Thus, the multipath load balancing method may be effective in addressing issues in load balanced systems in which the clients send relatively large amounts of data to the servers in addition to load balanced systems in which the servers send relatively large amounts of data to the clients.

Figure 3:
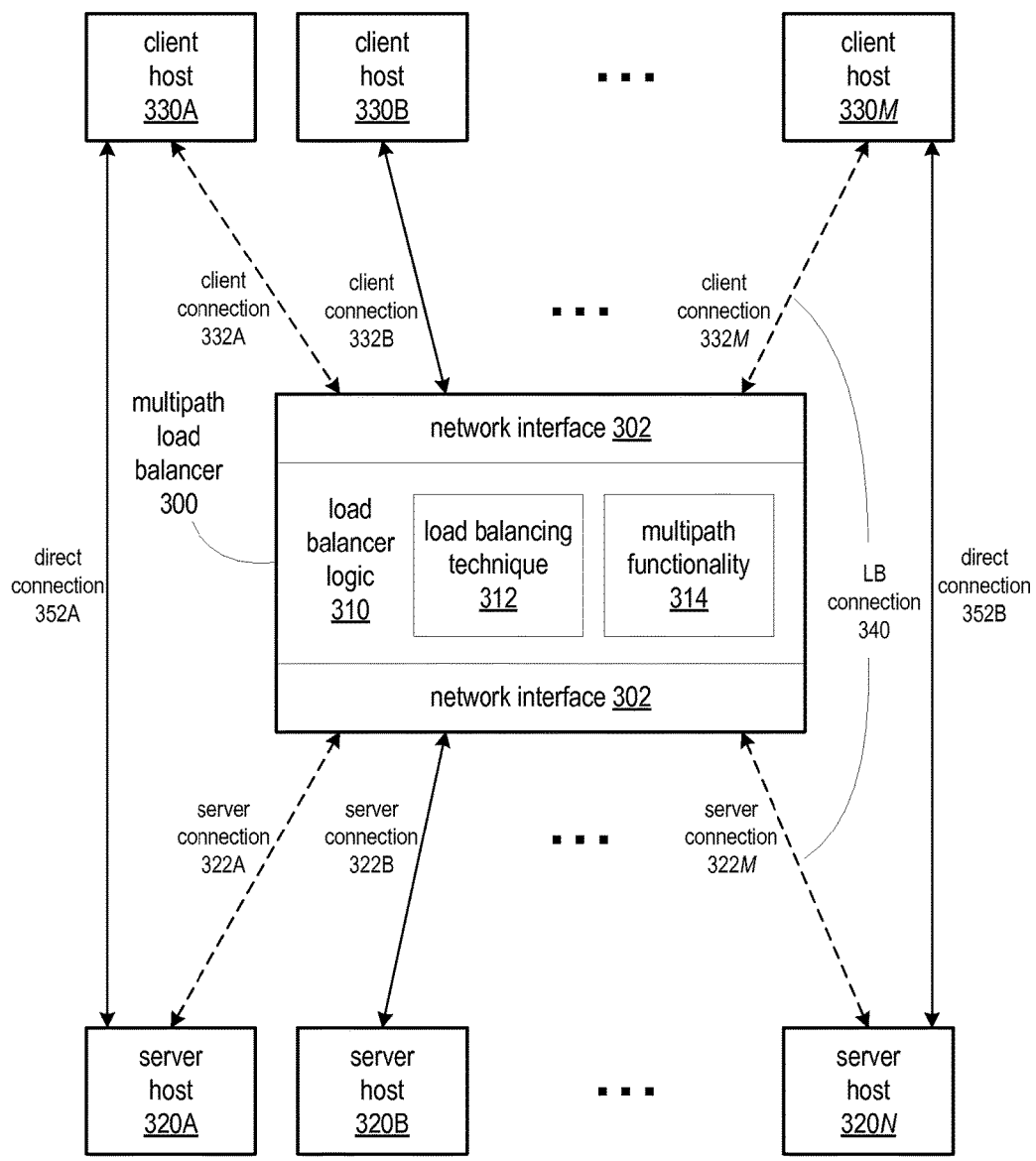
FIG. 3 illustrates a load balanced system in which multiple paths are established for connections between client hosts and server hosts according to embodiments of a multipath load balancing method.

FIG. 3 illustrates a load balanced system in which multiple paths are established for connections between client hosts and server hosts according to embodiments of a multipath load balancing method. A load balancer that implements an embodiment of the multipath load balancing method (shown as multipath load balancer 300) fronts multiple server hosts 320A, 320B . . . 320N that host one or more services. Multipath load balancer 300 may receive connection requests from multiple client hosts 330A, 330B . . . 330M for access to the service(s) provided by the server hosts 320 fronted by the load balancer 300.

As a non-limiting example, multipath load balancer 300 may be implemented as one or more devices that includes a network interface 302, for example implemented as or by one or more network interface controllers (NICs), that handles inbound traffic from/outbound traffic to client hosts 330 and inbound traffic to/outbound traffic from the server hosts 320 that are being load balanced. Load balancer 300 may also include logic 310 (one or more processors, memory, software, data, drivers, etc.) that implements load balancing functionality including but not limited to a load balancing technique 312 (e.g., a least conns technique) used to select a particular server host 320 from among the multiple server hosts 320 fronted by the load balancer 300 to receive a given data flow from a client 330. Load balancer logic 310 may also implement multipath functionality 314 that implements the multipath load balancing method in the load balanced system as described herein.

FIG. 3 shows a single load balancer 300 device. Note, however, that in some implementations a load balanced system may include two or more load balancer 300 devices. For example, each of two or more load balancers 300 in such a system may be configured to load balance traffic from client hosts 330 to a specified subset of the server hosts 320, or to load balance traffic for a specified address range. Further note that a load balanced system may include one or more other components than those shown in FIG. 3. For example, a load balanced system may include one or more routers or other network devices located between load balancer 300 and client hosts 330, and/or a network fabric (e.g., an L3 network) between load balancer 300 and server hosts 320.

In at least some embodiments, a client host 330A connects to a load balancer 300 (e.g., to one of one or more Virtual IP (VIP) addresses hosted by the load balancer 300) that implements the multipath load balancing method. The connection between the client host 330A and the multipath load balancer 300 may be referred to as a client connection 332A. The multipath load balancer 300 uses a load balancing technique (e.g., least connections, or least conns) to select a particular server host 320 (e.g., server host 320A) from among multiple server hosts 320 fronted by the multipath load balancer 300. Note that other load balancing techniques, such as round robin techniques, may be used to select a server host 320 for a connection in some embodiments. The multipath load balancer 300 then establishes a connection to the selected server host 320A, for example a connection to an IP address/port published by the server host 320A. The connection between the multipath load balancer 300 and the selected server host 320A may be referred to as a server connection 322A. Packets (e.g., TCP segments) may then begin to be exchanged between the client host 330A and the server host 320A via the connections 332A and 322A through the multipath load balancer 300. The load balancer 300 terminates the connection from the client host 330A (client connection 332A) and sends the client traffic to the respective server host 320A via the server connection 322A. Similarly, the load balancer 300 terminates the connection from the server host 320A (server connection 322A) and sends the response traffic to the respective client host 330A via the client connection 332A.

In at least some embodiments, when a client host 330 communicates with multipath load balancer 300 to establish a connection to a service hosted by the server hosts 320, the load balancer 300 determines if the client host 330 supports the multipath protocol (e.g., MPTCP) as part of the connection negotiation process. In FIG. 3, client host 330A does support the multipath protocol. For a client host 330A that supports the multipath protocol, after establishing a connection between the client host 330A and a selected server host 320A through multipath load balancer 300 via connections 332A and 332B, the multipath load balancer 300 may facilitate the establishment of a direct connection 352A between the client host 330A and the server host 320A according to the multipath protocol. As used herein, a direct connection 352 in a load balanced system is a connection between a client host 330 and a server host 320 that does not pass through the load balancer. The direct connection 352A may serve as another path for the connection between the client host 330A and the server host 320A. In at least some embodiments, to facilitate the establishment of the direct connection 352A, multipath load balancer 300 may first obtain address/port (e.g., socket) information from server host 320A, and then propose to the client host 330A establishment of a direct connection to the server host 320A. If the client host 330A accepts the proposal, the client host 330A may then communicate with the server host 320A to establish the direct connection 352A between the client host 330A and the server host 320A.

Once the direct connection 352A is established, data flowing on the connection between the client host 330A and the server host 320A can take one of the two paths, with one path passing through multipath load balancer 300 via connections 332A and 322A and the other path passing through direct connection 352A. These two paths for data flow may be referred to as subflows for the connection between the client host 330A and the server host 320A.

In at least some embodiments, the multipath protocol may allow an entity on a connection to specify or advertise a window size for the entity as a receiver on the connection. The window size specified by a receiver indicates how much data can be outstanding on the connection for the receiver. The other entity (the sender) will not send more than that amount of data to leave that amount of data outstanding at any time. As the receiver receives and acknowledges receipt of data on the connection, the sender may send more data. Note that both entities on a given connection may establish a window size for receiving data at the entity on the connection.

Referring to FIG. 3, in at least some embodiments, multipath load balancer 300 may initially advertise a standard or default window size to client host 330A for client connection 332A, and to server host 320A for server connection 322A. Thus, initially, the rate of data flow in both directions between the client host 330A and the server host 320A over connections 332A and 322A may be controlled or limited by the window size(s) advertised by the load balancer 300 for the two connections. Note that the advertised window sizes for the two connections may be the same, or may be different. In at least some embodiments, the load balancer 300 may choose the window size advertised to each sending peer on a connection to restrict the rate at which each peer may send data on the connection.

In at least some embodiments, when the client host 330A and the server host 320A establish a direct connection 352A between the client host 330A and the server host 320A, each advertises a window size for the direct connection 352A to the other. The rate of data flow from the client host 330A to the server host 320A is controlled by the window size specified by the server host 320A, and conversely the rate of data flow from the server host 320A to the client host 330A is controlled by the window size specified by the client host 330A. Note that the window sizes advertised by the client host 330A and the server host 320A for the direct connection 352A may be the same, or may be different. Further, the window sizes advertised by the client host 330A and the server host 320A for the direct connection 352A may be the same as or different than the window sizes advertised by the load balancer for connections 332A and 322A.

After the direct connection 352A between the client host 330A and the server host 320A is established, data may begin flowing between the client host 330A and the server host 320A over the two subflows for the connection, with the rate of data flow on each of the subflows controlled or limited by the window size(s) for the connection(s) on the respective subflow. In at least some embodiments, the load balancer 300 may reduce the window size for one or both of connections 322A and 332A to move at least some data flow off of the subflow through the load balancer 300 and onto the subflow over the direct connection 352A. Reducing the window size(s) may reduce the rate of data flow through the load balancer 300 on the connection between the client host 330A and the server host 320A in one or both directions. Data that would flow through the load balancer 300 on the connection may instead flow over the direct connection 352A. Thus, reducing the window size(s) for the connections 322A and 332A may increase the data flow rate in one or both directions over the direct connection 352A.

In at least some embodiments, the subflow through the load balancer 300 over connections 322A and 332A may be persisted after establishing the direct connection 352A and reducing the window size(s) so that the connection between the client host 330A and the server host 320A can be monitored, and so that load balancing of the server hosts 320 (e.g., via a least conns technique) fronted by the load balancer 300 can be properly performed. However, in at least some embodiments, the window size for one or both of connections 322A and 332A may be reduced to the point where the rate of data flow for the connection through the load balancer 300 is very low compared to the rate of data flow over the direct connection 352A. Thus, the majority of data flowing between the client host 330A and the server host 320A may pass over the direct connection 352A, with a small amount of data allowed to pass through the load balancer 300 so that the load balancer 300 can monitor the connection between the client host 330A and the server host 320A.

In some embodiments, for at least some connections through the load balancer 300 that are established according to the multipath protocol, the load balancer 300 may choose to close the subflow for the connection through the load balancer 300 in both directions after a direct connection 352 between a client host 330 and a server host 320 is established. This, of course, results in all data flowing between the client host 330 and the server host 320 in both directions to pass over the direct connection 352. The LB connection 340 may be closed by closing the respective connections 332 and 322 on the load balancer 300. Alternatively, in some embodiments, the window size for both connections 332 and 322 may be reduced to zero.

In some embodiments, for at least some connections through the load balancer 300 that are established according to the multipath protocol, the load balancer 300 may choose to close the subflow for a connection through the load balancer 300 in only one direction after a direct connection 352 between a client host 330 and a server host 320 is established. In some embodiments, the subflow may be closed in one direction by reducing the window size for the appropriate connection 332 or 322 to zero.

As shown in FIG. 3 by direct connection 352B between client host 330M and server host 320N, the multipath load balancer 300 may establish connections between multiple ones of the client hosts 330 and selected ones of the server hosts 320 according to the multipath protocol (e.g., MPTCP), with direct connections 352 established between respective client hosts 330 and server hosts 320. However, one or more of clients 330A, 330B . . . 330M may not support the multipath protocol, or may reject the proposal to establish a second path to a server 320 according to the multipath protocol for some reason. In addition, one or more of server hosts 320A, 320B . . . 320N may reject the proposal to establish a second path to a client 330 according to the multipath protocol. In these cases, as shown in FIG. 3 by the connection between client host 330B and server host 320B through multipath load balancer 300 via client connection 332B and server connection 322B, no direct connection 352 is established between the client host 330B and the server host 320B, and all data flowing between the client host 330B and the server host 320B passes through the load balancer 300.

Figure 4:
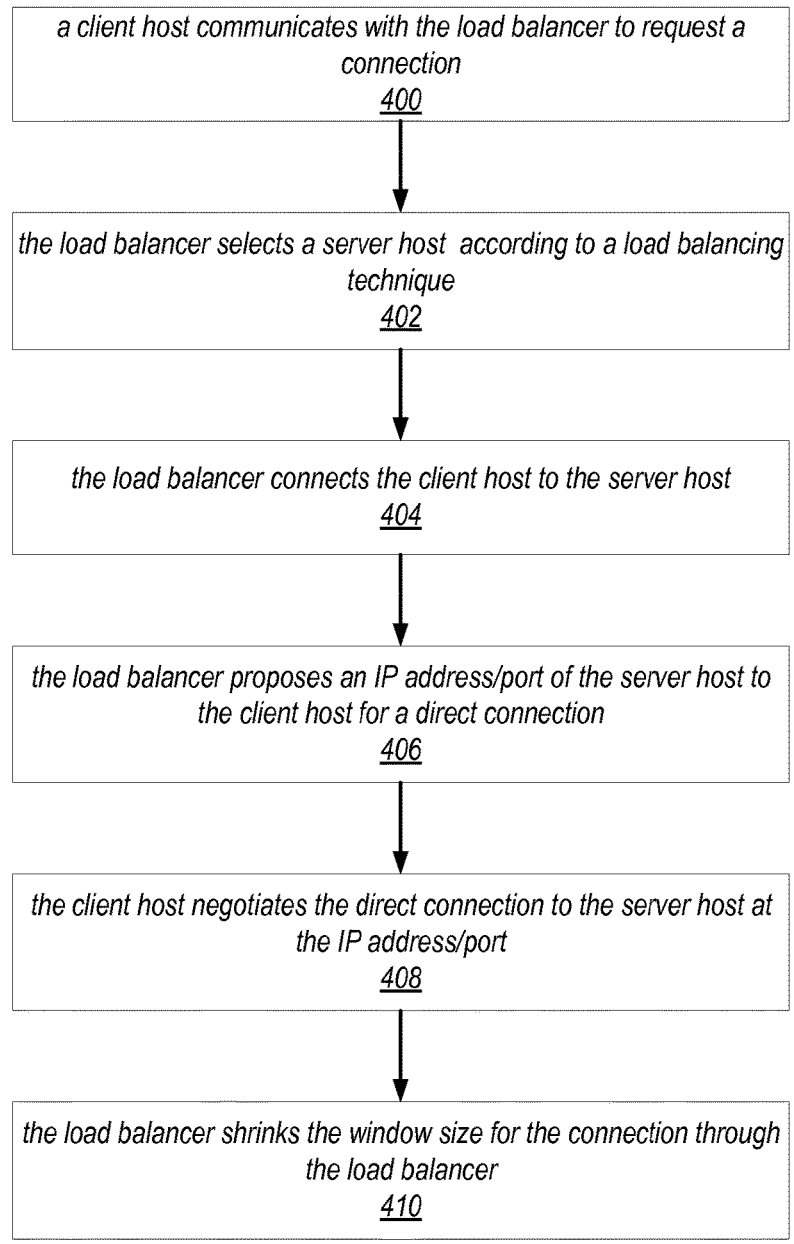
FIG. 4 is a flowchart of a multipath load balancing method, according to at least some embodiments.

FIG. 4 is a flowchart of a multipath load balancing method that may be implemented in a load balanced system, according to at least some embodiments. The discussion of FIG. 4 refers to FIGS. 5A through 5E, which graphically illustrate establishing multiple paths for a connection between a client host and a server host in a load balanced system according to embodiments of a multipath load balancing method as illustrated in FIG. 4.

Referring to FIGS. 5A through 5E, a load balancer that implements the multipath load balancing method may be referred to as a multipath load balancer 500. While these Figures show only a single server host 520 and client host 530 for simplicity, the multipath load balancer 500 may front tens, hundreds, or thousands of server hosts, and may receive connection requests from multiple client hosts for access to the service(s) provided by the server hosts fronted by the load balancer 500. Note that a load balancer 500 may serve any number (tens, hundreds, thousands, or more) of client hosts. The multipath load balancer 500 acts to load balance connections from the client hosts to the server hosts according to a load balancing technique, each connection corresponding to a particular data flow between a respective client host 530 and server host 520. In at least some embodiments, the load balancing technique may be a least connections, or least conns, technique. However, other load balancing techniques may be used, for example round robin techniques.

Further note that while FIG. 4 and FIGS. 5A through 5E generally describe using the multipath load balancing method in a proxy load balancer as illustrated in FIGS. 1A and 1B in which an LB connection 140 includes a client connection 132 and a server connection 122 that are terminated at the load balancer 100, the multipath load balancing method may also be applied in pass-through load balancers as illustrated in FIG. 1C in which an LB connection 140 is established between endpoints at the client and server that goes through but is not terminated at the load balancer 100.

The multipath load balancing method implemented by the multipath load balancer 500 in the load balanced system may leverage a multipath protocol to establish multiple (two or more) paths for at least some connections between the client hosts and the server hosts in the load balanced system. While any suitable multipath protocol may be used, an example multipath protocol that may be used in at least some embodiments is Multipath Transmission Control Protocol (Multipath TCP, or MPTCP). The multipath load balancing method as illustrated in FIG. 4 assumes that both the client host 530 and the selected server host 520 support the multipath protocol (e.g., MPTCP).

Figure 5A:
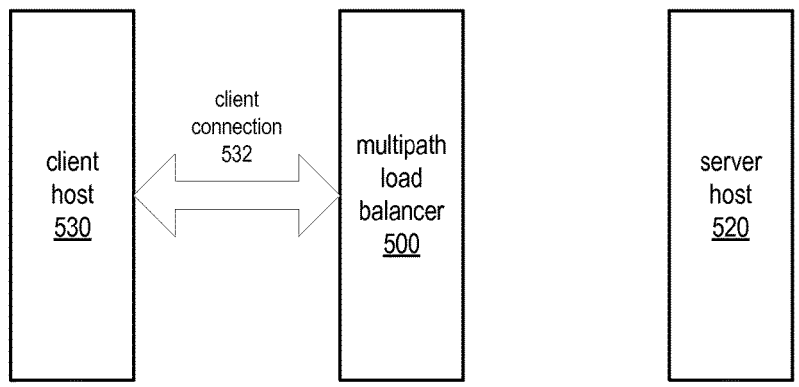
FIGS. 5A through 5E graphically illustrate establishing multiple paths for a connection between a client host and a server host according to embodiments of a multipath load balancing method.

As indicated at 400 of FIG. 4 and illustrated in FIG. 5A, a client host 530 communicates with the multipath load balancer 500 (e.g., to a Virtual IP (VIP) address hosted by the load balancer 500) according to a network protocol (e.g., Transmission Control Protocol (TCP)) to request a connection, for example a connection to a service fronted by the load balancer 500. In at least some embodiments, to communicate with the multipath load balancer 500 to request a connection, the client host 530 may request an IP address of a service hosted by the server hosts 520 in the load balanced system from another service such as a Domain Name Server (DNS). The DNS returns an IP address of the load balancer 500. The client host 530 then sends an initial connection request to the IP address of the load balancer 500 according to a network protocol (e.g., TCP). In at least some embodiments, once the client host 530 requests the connection, the load balancer 500 may negotiate with the client host 530 to establish a client connection 532 to the load balancer 500. At 400, in the process of communicating with the requesting client host 530, the load balancer 500 may determine if the client host 530 supports the multipath network protocol (e.g., MPTCP).

As indicated at 402 of FIG. 4, after the client host 530 requests the connection, the load balancer 500 selects a server host 520 for the connection request from among the multiple server hosts fronted by the load balancer 500 according to a load balancing technique. The multipath load balancer 500 may, for example, use a least connections load balancing technique to select a server host 520. However, other load balancing techniques, such as round robin techniques, may be used.

Figure 5B:
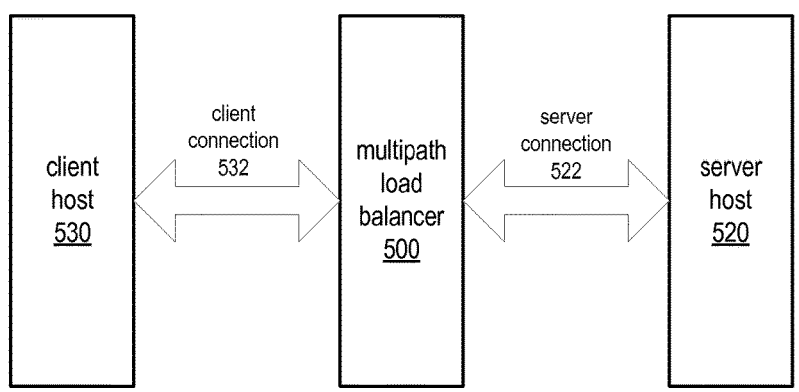

As indicated at 404 of FIG. 4 and illustrated in FIG. 5B, the load balancer 500 connects the client host 530 to the selected server host 520, for example to an IP address/port published by the server host 520. In at least some embodiments, to connect the client host 530 to the selected server host 520, the load balancer 500 establishes a connection to the server host 520. The connection between the load balancer 500 and the server host 520 may be referred to as a server connection 522. Note that the load balancer 500 may open a new server connection 522 to the server host 520 or may reuse an existing server connection 522 to the server host 520.

In at least some embodiments, after the client connection 532 and server connection 522 are established, packets (e.g., TCP segments) may be exchanged between the client host 530 and the server host 520 through the multipath load balancer 500 via the connections 532 and 522. The load balancer 500 terminates the connection from the client host 530 (client connection 532) and sends the client traffic to the respective server host 520 via the server connection 522. Similarly, the load balancer 500 terminates the connection from the server host 520 (server connection 522) and sends the response traffic to the respective client host 530 via the client connection 532.

In at least some embodiments, as part of establishing the connection between the client host 530 and the server host 520 that passes through the load balancer 500, the multipath load balancer 500 may advertise a window size for the connection to the client host 530 and server host 520. In at least some embodiments, the load balancer 500 may initially advertise a standard or default window size to client host 530 for client connection 532, and to server host 520 for server connection 522. Thus, initially, the rate of data flow in both directions between the client host 530 and the server host 520 over the connection that passes through the load balancer 500 may be controlled or limited by the window size(s) advertised by the load balancer 500 for the two connections.

Figure 5C:
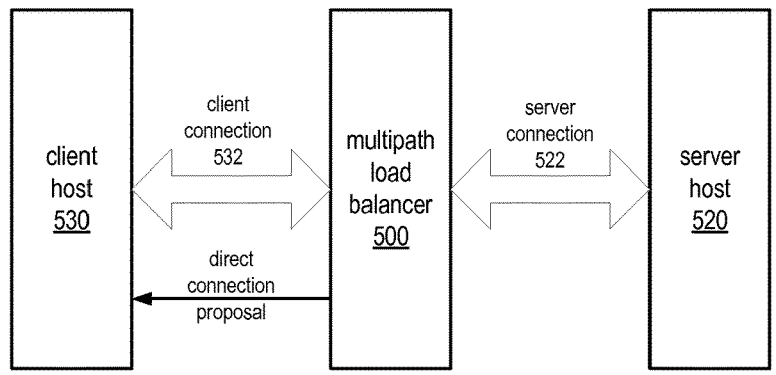

As indicated at 406 of FIG. 4 and illustrated in FIG. 5C, the load balancer 500 proposes an IP address/port (e.g., an endpoint or socket) of the server host 520 to the client host 530 for establishing a direct connection 552 from the client host 530 to the server host 520. Note that a direct connection as used herein refers to a connection between a client and a server in a load balanced system that does not pass through the load balancer. In at least some embodiments, the load balancer 500 may query the server host 520 to determine an IP address/port that may be used for a direct connection 552 to the client host 530 according to the multipath protocol. The load balancer 500 may then send one or more messages or packets to the client host 530 according to the multipath protocol proposing a direct connection 552 to the server host 520, the messages indicating the IP address/port of the server host 520. In at least some embodiments, in at least some cases, rather than proposing an endpoint of the server host 520 to the client host 530 for establishing a direct connection 552, the load balancer 500 may instead propose an endpoint of the client host 530 to the server host 520 for establishing a direct connection 552 from the server host 520 to the client host 530.

Figure 5D:
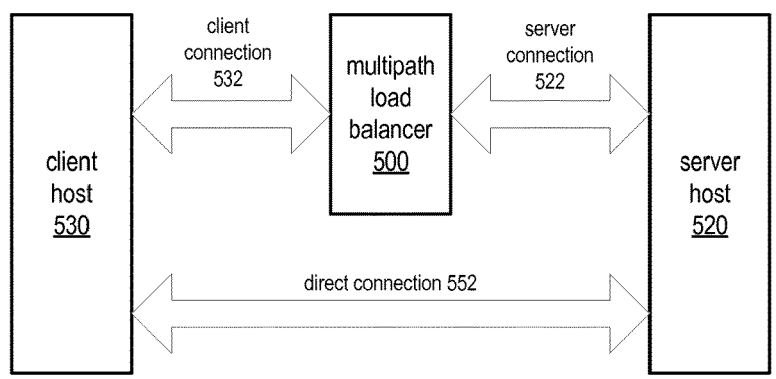

As indicated at 408 of FIG. 4 and illustrated in FIG. 5D, the client host 530 opens a subflow for the connection/data flow directly to the server host 520 at the indicated IP address/port according to the multipath protocol (e.g., MPTCP). The connection between the client host 530 and the server host 520 may be referred to as a direct connection 552. In at least some embodiments, in response to the proposal received from the load balancer 500, the client host 530 may negotiate directly with the server host 520 to establish the direct connection 552 to the IP address/port of the server host 520. As part of the negotiation, one or both of the client host 530 and the server host 520 may specify or advertise a window size for the direct connection 552. The rate of data flow from the client host 530 to the server host 520 may be controlled by the window size specified by the server host 520, and conversely the rate of data flow from the server host 520 to the client host 530 may be controlled by the window size specified by the client host 530. Note that the window sizes advertised by the client host 530 and the server host 520 for the direct connection 552 may be the same, or may be different. Further, the window sizes advertised by the client host 530 and the server host 520 for the direct connection 552 may be the same as or different than the window sizes advertised by the load balancer for connections 532 and 522.

After the direct connection 552 between the client host 530 and the server host 520 is established, data may begin flowing between the client host 530 and the server host 520 over the two subflows for the connection, one subflow over direct connection 552 and the other subflow through load balancer 500 via connections 532 and 522. The rate of data flow on each of the subflows may be controlled or limited by the window size(s) for the connection(s) on the respective subflow.

Figure 5E:
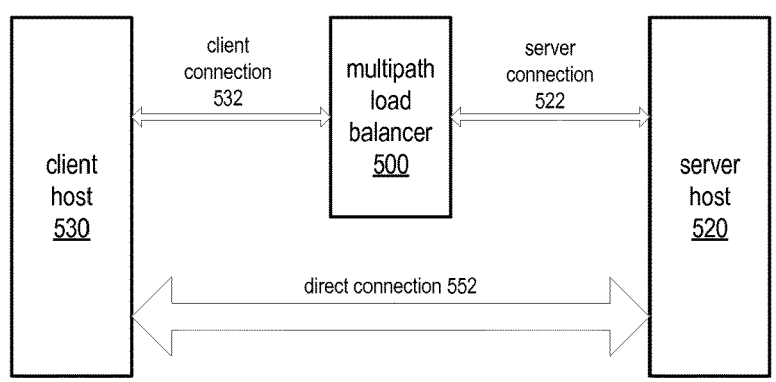

As indicated at 410 of FIG. 4 and illustrated in FIG. 5E, after the direct connection 552 is established, the load balancer 500 may shrink or reduce the window size for one or both of the client and server connections. In at least some embodiments, the load balancer 500 may reduce the window size for one or both of connections 522 and 524 to move at least some data flow from the subflow that passes through the load balancer 500 via connections 522 and 524 onto the subflow over the direct connection 552. Reducing the window size(s) may reduce the rate of data flow through the load balancer 500 on the connection between the client host 530 and the server host 520 in one or both directions; data that would flow on the subflow through connections 532 and 522 and thus through the load balancer 500 may instead flow over the direct connection 552 without passing through the load balancer 500. Thus, reducing the window size(s) for the connections 522 and 532 may increase the data flow rate in one or both directions over the direct connection 552, and reduce the data flowing through the load balancer 500.

In at least some embodiments, the subflow through the load balancer 500 over connections 522 and 532 may be persisted after establishing the direct connection 552 and reducing the window size(s) so that the connection between the client host 530 and the server host 520 can be monitored, and so that load balancing of the server hosts (e.g., via a least conns technique) fronted by the load balancer 500 can be properly tracked and performed. However, in at least some embodiments, the window size for one or both of connections 522 and 532 may be reduced to the point where the rate of data flow for the connection through the load balancer 500 is very low compared to the rate of data flow over the direct connection 552. Thus, the majority of data flowing between the client host 530 and the server host 520 may pass over the direct connection 552, with a relatively small amount of data allowed to pass through the load balancer 500 so that the load balancer 500 can still monitor the connection between the client host 530 and the server host 520, while at the same time reducing the data on the connection that flows through the load balancer 500.

In some embodiments, for at least some connections through the load balancer 500 that are established according to the multipath protocol, the load balancer 500 may choose to close the subflow for the connection through the load balancer 500 in both directions after a direct connection 552 between a client host 530 and a server host 520 is established. This, of course, results in all data flowing between the client host 530 and the server host 520 in both directions to pass over the direct connection 552. The LB connection that passes through the load balancer 500 may be closed by closing the respective connections 532 and 522 on the load balancer 500. Alternatively, in some embodiments, the window size for both connections 532 and 522 may be reduced to zero. In some embodiments, for at least some connections through the load balancer 500 that are established according to the multipath protocol, the load balancer 500 may choose to close the subflow for a connection through the load balancer 500 in only one direction after a direct connection 552 between a client host 330 and a server host 520 is established. In some embodiments, the subflow may be closed in one direction by reducing the window size for the appropriate connection 532 or 522 to zero.

The multipath load balancing method as illustrated in FIG. 4 assumes that both the client host 530 and the selected server host 520 support the multipath protocol (e.g., MPTCP), and that both hosts accept the request to open a direct connection as a subflow for the connection. If one or both hosts on a load balanced connection do not support the multipath protocol, or if either host chooses not to establish a direct connection for a given connection, then a direct connection is not established between the client host 530 and server host 520, and the data flow for the connection passes through the load balancer 500 in both directions via the client and server connections.

The multipath load balancing method as illustrated in FIG. 4 opens direct connections for subflows of connections between the client hosts and server hosts in a load balanced system according to the multipath protocol and throttles down the traffic that passes through the load balancer 500 by reducing the window sizes of the connections at the load balancer 500. The multipath load balancing method thus reduces the amount of data that flows through the load balancer 500 on the connections. This helps to address the bottleneck issue of load balancers, as a load balancer of a given bandwidth (e.g., 40 Gigabits per second (Gbps)) can support more connections between client hosts and server hosts, since much of the data flowing on at least some of the connections may be passed over the direct connection rather than through the load balancer. In other words, bandwidth usage for the load balanced system gets moved off of the load balancer and onto the direct connections. Thus, fewer load balancers, or load balancers with fewer NICs, may be needed in a load balanced system. In addition, the multipath load balancing method may allow less expensive load balancers to be used in load balanced systems to support a similar number of connections and/or amount of client/server traffic as could be supported using conventional load balancing techniques and more expensive load balancers. For example, a 10 Gbps load balancer utilizing the multipath load balancing method may be able to support as many connections and/or a similar amount of client/server traffic as could be supported by a 40 or 80 Gbps load balancer using conventional load balancing methods. In addition, fewer and/or less expensive routers or other network devices may be needed between the load balancer(s) and the client hosts in the load balanced system when using the multipath load balancing method.

Subflow Authentication

Establishing a multipath protocol (e.g., MPTCP) connection may typically involve a handshake process that includes a (cryptographic) key exchange, e.g. a 64-bit key exchange. When a multipath protocol connection is established between a client host and a server host through a load balancer in a load balanced system and the load balancer facilitates creation of a new subflow between the client and server according to the multipath protocol, a new connection (the direct connection) is established between the client and server (with the load balancer acting as a go-between). For security purposes, for example to prevent entities from establishing false subflows on a multipath protocol connection to snoop or steal data, the establishment of the direct connection for the additional subflow should be authenticated. However, the load balancer is acting between the server and client. Thus, in at least some embodiments, to authenticate the new subflow, the load balancer must ensure that both the client host and the server host see a consistent handshake with the same keys as if the load balancer were not in the middle. If there is a crypto algorithm exchange between the client and server, the load balancer must also ensure that this is passed unchanged.

Subflow Initiation

In a load balanced system as described herein, the client and server (which may be referred to as peers) on a multipath protocol connection will initially see the other peer's IP address as that of the load balancer. Assuming neither peer has an additional IP address for the connection, then neither peer may have a reason to suggest to the other peer to establish a second direct link for the multipath protocol connection. Solutions for this that may be used in embodiments may include, but are not limited to, the following:

- The load balancer may inject extra data into the conversation (e.g., a duplicate ACK), which simulates one peer publishing its own IP address to the other peer.
- At least some servers in the load balanced system may be configured with at least two IP addresses (one for the load balancer, one for the client(s)); the servers publish their client IP addresses automatically, and the clients see the published client IP addresses of the servers and thus can connect directly.
- At least some servers in the load balanced system may be configured to publish its own single IP address on startup of a multipath protocol subflow; the clients may then connect directly to the published IP addresses.

Throttling the Subflows Through the Load Balancer

While the above discussion describes reducing the window size(s) (or closing) the server and client connections on the load balancer to throttle down the data flowing through the load balancer on a given multipath protocol connection and thus push data onto the direct connection between the client host and server host, there may be other methods for controlling the amount of traffic on the two (or more) subflows of a multipath connection in a load balanced system. Methods for throttling traffic flow through the load balancer may include one or more of, but are not limited to, the following:

- The initial path through the load balancer may be closed by the load balancer once the direct connection is up and running so that all traffic goes through the direct connection.
- The load balancer can set the path through the load balancer as a backup path, for example by setting the path to have backup link priority according to MPTCP, to push most or all traffic to the direct connection.
- As previously described herein, both paths may have the same priority, but the load balancer can reduce the window size(s) on the path that passes through the load balancer (e.g., on the client and server connections) to cause traffic to move to the direct connection.
- The load balancer may purposefully and negatively affect traffic flowing on the path that passes through the load balancer, for example by intentionally introducing delays, reordering, or packet dropping, to cause the client and/or server to preferably select the direct connection for future traffic. A network process on the client and/or server may detect that quality of data transmission on the path that passes through the load balancer has degraded (e.g., because of dropped packets, delays, or out-of-order packets) and thus push or move at least some of the data flow from the path that passes through the load balancer onto the alternate, direct connection between the client and the server.

Illustrative System

In at least some embodiments, a server that implements a portion or all of the methods and apparatus for load balancing using a multiple path (multipath) protocol as described herein may include a general-purpose computer system or computing device that includes or is configured to access one or more computer-accessible media, such as computer system 2000 illustrated in FIG. 6. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for multipath load balancing, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 5E, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 5E for implementing multipath load balancing in load balanced systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A load balanced system, comprising:
   a plurality of server hosts configured to implement a service on a network; and
   a load balancer implemented via one or more hardware processors and configured to distribute connections from one or more client hosts on the network to the plurality of server hosts according to a load balancing technique;
   wherein the load balancer is further configured to, for a particular connection:
     receive a connection request for the service from a client host according to a network protocol;
     in response to the connection request, establish a path on the network for a data flow for the particular connection between the client host and a selected one of the plurality of server hosts, the path going through the load balancer;
     determine that the client host supports a multipath protocol; and
     in response to said determine, facilitate establishment of a direct path on the network for a portion of the data flow for the particular connection between the client host and the selected server host according to the multipath protocol, wherein the direct path does not go through the load balancer, and wherein the path for another portion of the data flow for the same particular connection between the client host and the server host that goes through the load balancer remains established concurrently with the direct path for the portion of the data flow for the same particular connection;
   wherein, subsequent to establishment of the direct path, the portion of the data flow for the particular connection between the client host and the server host passes over the direct path between the client host and the server host and does not pass through the load balancer that established the particular connection and the other portion of the data flow for the same particular connection between the client host and the server host continues to pass through the load balancer that established the particular connection.

2. The load balanced system as recited in claim 1, wherein, to establish the path on the network for the data flow between the client host and the selected server host that passes through the load balancer, the load balancer is configured to:
   establish a client connection between the client host and the load balancer;
   select the server host for the connection from among the plurality of server hosts according to the load balancing technique; and
   establish a server connection between the load balancer and the selected server host;
   wherein the load balancer is further configured to receive client data from the client host via the client connection, send the client data to the server host via the server connection, receive response data from the server host via the server connection, and send the response data to the client host via the client connection.

3. The load balanced system as recited in claim 2, wherein, to facilitate establishment of the direct path on the network for the data flow between the client host and the selected server host, the load balancer is configured to communicate an address of the server host to the client host, wherein the client host establishes a direct connection to the server host at the address over the network according to the multipath protocol, and wherein the direct path is via the direct connection.

4. The load balanced system as recited in claim 1, wherein, subsequent to establishment of the direct path, the load balancer is further configured to reduce a window size for the path that goes through the load balancer so that a majority of the data flow for the particular connection is moved from the other portion that goes through the load balancer onto the portion that does not go through the load balancer and a remaining portion of the data flow for the particular connection remains at the other portion that goes through the load balancer.

5. The load balanced system as recited in claim 1, wherein the load balancer is further configured to close the path that goes through the load balancer so that all of the data flow between the client host and the server host passes over the direct path.

6. A method, comprising:
   receiving, by a load balancer comprising one or more hardware processors, connection requests from one or more clients;
   for at least one of the connection requests, establishing, by the load balancer, a connection between a respective client and a server selected from among a plurality of servers fronted by the load balancer, wherein data flow for the connection is between the respective client and the respective server on the connection via a path that goes through the load balancer; and
   for the connection, establishing another path for a portion of the data flow for the connection between the respective client and the respective server according to a multipath protocol, wherein the other path does not go through the load balancer, and wherein the path for another portion of the data flow for the same connection between the client host and the server host that goes through the load balancer remains established concurrently with the other path that does not go through the load balancer;
   wherein, subsequent to establishment of the other path for the connection, the portion of the data flow for the connection between the respective client and the respective server flows over the other path that does not go through the load balancer that established the connection and the other portion of the data flow for the same connection between the respective client and the respective server continues to go through the load balancer that established the connection.

7. The method as recited in claim 6, wherein the multipath protocol is a network protocol that supports establishment of two or more paths for data flow on a connection between peers.

8. The method as recited in claim 6, further comprising the load balancer distributing connections from the one or more clients to the plurality of servers according to a load balancing technique.

9. The method as recited in claim 8, wherein the load balancing technique is a least connections technique.

10. The method as recited in claim 8, wherein the load balancing technique is a round robin technique.

11. The method as recited in claim 6, wherein said establishing another path for the data flow between the respective client and the respective server according to a multipath protocol is performed in response to the load balancer determining that the respective client supports the multipath protocol.

12. The method as recited in claim 6, wherein said establishing a connection between the respective client and a server selected from among a plurality of servers fronted by the load balancer comprises:
   establishing a client connection between the client and the load balancer; and
   establishing a server connection between the load balancer and the selected server;
   wherein data flowing between the client and the server on the connection via the path that goes through the load balancer flows on the client connection between the client and the load balancer and on the server connection between the load balancer and the server.

13. The method as recited in claim 6, wherein said establishing a connection between the respective client and a server selected from among a plurality of servers fronted by the load balancer comprises establishing a connection between an endpoint of the client and an endpoint of the server that passes through the load balancer, wherein the load balancer modifies headers of packets of data passing through the load balancer on connections between endpoints of the clients and endpoints of the servers so that the packets are routed to the appropriate client or server endpoints.

14. The method as recited in claim 6, wherein said establishing another path for the data flow between the respective client and the respective server according to a multipath protocol comprises:
   proposing, by the load balancer to the client according to the multipath protocol, establishment of a direct connection for the connection between the client and the respective server; and
   establishing, by the client, the direct connection to the server according to the multipath protocol.

15. The method as recited in claim 6, further comprising, subsequent to establishment of the other path for the connection, reducing a window size for the path that goes through the load balancer so that a majority of the data flow for the connection is moved from the other portion that goes through the load balancer onto the portion that does not go through the load balancer.

16. The method as recited in claim 6, further comprising closing the path that goes through the load balancer so that all of the data flowing between the respective client and the respective server flows over the other path that does not go through the load balancer.

17. The method as recited in claim 6, further comprising, subsequent to establishment of the other path for the connection:
   the load balancer negatively affecting quality of data transmission on the path that goes through the load balancer; and
   one or both of the respective client and the respective server moving most or all of the data flowing onto the other path that does not go through the load balancer in response to detecting that the quality of data transmission on the path that goes through the load balancer has been negatively affected.

18. A load balancer device, comprising:
   one or more hardware processors; and
   a memory comprising program instructions executable by at least one of the one or more processors to:
      establish connections between clients and servers selected from among a plurality of servers according to a load balancing technique, wherein data flow on a connection between a respective client and a respective server is via a path that passes through the load balancer device; and
      for the connection, facilitate establishment of another path for a portion of the data flow on the connection between the respective client and the respective server according to a multipath protocol, wherein the other path does not pass through the load balancer device, and wherein the path for another portion of the data flow on the same connection between the respective client and the respective server that passes through the load balancer device remains established concurrently with the other path that does not pass through the load balancer device;
      wherein, subsequent to establishment of the other path for the connection, the portion of the data flow on the connection from the respective client to the respective server flows over the other path that does not go through the load balancer device that established the connection and the other portion of the data flow on the same connection from the respective client to the respective server continues to pass through the load balancer device that established the connection.

19. The load balancer device as recited in claim 18, wherein the program instructions are executable by at least one of the one or more processors to, subsequent to establishment of the other path for the connection, reduce a window size for the path that passes through the load balancer device so that a majority or all of the data flowing between the respective client and the respective server flows over the other path and does not pass through the load balancer device.

20. The load balancer device as recited in claim 18, wherein the multipath protocol is a network protocol that supports establishment of two or more paths for data flow on a connection between peers.

21. The load balancer device as recited in claim 18, wherein the load balancing technique is a least connections technique.

22. The load balancer device as recited in claim 18, wherein, to establish a connection between a client and a selected server, the program instructions are executable by at least one of the one or more processors to:
   establish a client connection between the client and the load balancer device; and
   establish a server connection between the load balancer device and the selected server;
   wherein data flowing between the client and the server on the connection via the path that goes through the load balancer device flows on the client connection between the client and the load balancer and on the server connection between the load balancer and the server.

23. The load balancer device as recited in claim 18, wherein, to facilitate establishment of another path for the connection between the respective client and the respective server according to a multipath protocol, the program instructions are executable by at least one of the one or more processors to communicate an IP address of the server to the client, wherein the client establishes a direct connection to the server at the IP address according to the multipath protocol.

\* \* \* \* \*